United States Patent [19]

Hagiwara et al.

[11] Patent Number: 4,711,916

[45] Date of Patent: Dec. 8, 1987

[54] INORGANIC FILLER DISPERSED-RESIN COMPOSITION

[75] Inventors: Takeshi Hagiwara; Masataka Matsuo, both of Fukuoka; Tanezoh Tamehiro, Hyogo; Taizo Tamehiro, Hyogo; Kakuichi Murakami, Hyogo, all of Japan

[73] Assignees: Nippon Steel Corporation, Tokyo; Harima Refractory Co., Ltd., Takasago, both of Japan

[21] Appl. No.: 828,094

[22] Filed: Feb. 10, 1986

Related U.S. Application Data

[63] Continuation of Ser. No. 537,441, Sep. 30, 1983, abandoned.

[30] Foreign Application Priority Data

Sep. 30, 1982 [JP] Japan .................................. 57-172266

[51] Int. Cl.⁴ .......................... C08K 3/36; C08K 3/22
[52] U.S. Cl. ...................................... 523/223; 523/440; 523/443; 524/430; 524/432; 524/492; 524/493; 106/306; 106/309; 106/299
[58] Field of Search ................... 106/309, 306, 299; 523/223, 220; 524/430, 432, 492, 493

[56] References Cited

U.S. PATENT DOCUMENTS

| | | | |
|---|---|---|---|
| 3,452,437 | 7/1969 | Chang | 523/223 |
| 3,714,107 | 1/1973 | Smith | 523/220 |
| 3,801,536 | 4/1974 | Guenantin | 524/442 |
| 3,920,603 | 11/1975 | Stayner et al. | 523/220 |
| 3,923,676 | 12/1975 | Rasanen | 106/193 M |
| 4,079,162 | 3/1978 | Metzger | 523/223 |
| 4,168,259 | 9/1979 | Coleman | 523/220 |
| 4,238,641 | 12/1980 | Planting | 523/223 |
| 4,340,579 | 7/1982 | Greber et al. | 524/430 |

FOREIGN PATENT DOCUMENTS

| | | | |
|---|---|---|---|
| 54-155244 | 12/1979 | Japan | 523/223 |
| 55-23116 | 2/1980 | Japan | 523/223 |
| 58-138740 | 8/1983 | Japan | 523/223 |
| 58-206663 | 12/1983 | Japan | 523/223 |
| 1416626 | 12/1975 | United Kingdom | 523/223 |

OTHER PUBLICATIONS

Katz et al.; Handbook of Fillers and Reinforcements for Plastics; 1978; Van Nostrand Reinhold Co.; p. 302; Sci. Lib., TP 1142 H36.

*Primary Examiner*—Lewis T. Jacobs
*Attorney, Agent, or Firm*—Cushman, Darby & Cushman

[57] ABSTRACT

An inorganic filler dispersed-resin composition comprising a resin matrix and fused and spherical inorganic particles, such as ceramic particles produced by flame jet melting added in the resin matrix. The ceramic particles are selected from the group consisting of alumina, silica, magnesia, zircon, zirconia, and calcia, and the resin is selected from the group consisting of epoxy, phenol, acrylic polyester, silicone and ABS resins.

9 Claims, No Drawings

INORGANIC FILLER DISPERSED-RESIN COMPOSITION

This is a continuation of application Ser. No. 537,441, filed Sept. 30, 1983, now abandoned.

BACKGROUND OF THE INVENTION

1. Field of the Invention

The present invention relates to an inorganic filler dispersed-resin composition having excellent mechanical strength and heat conductivity and particularly suitable for the use in electronic parts.

2. Description of the Prior Arts

The addition of an inorganic filler to formed articles of resin has been known for increasing such properties as mechanical strength, heat resistivity and dimensional stability and has been practised also form the point of lowering the production cost. In the case where the formed articles are for the use in electronic parts, the improvement of thermal conductivity is particularly important besides the above-mentioned properties.

Conventionally, the inorganic filler materials are generally divided into fine particles by grinding and resultant divided particles are angulated, so that their fluidity when added in the resin matrix is low and their dispersivity in the resin matrix is poor, rather deteriorating the mechanical strength of the formed articles when added in a large amount. Furthermore, since the particles are angulated, there are such defects that metal molds used for forming such filler dispersed-resin articles are subjected to severe attack by the resins, and the resultant resin articles themselves show a poor surface smoothness.

SUMMARY OF THE INVENTION

Under such circumstances, the object of the present invention is to offer an inorganic filler dispersed-resin composition which solves the above defects of the conventional resin compositions.

The principle of the invention lies in addition of fused and spherical inorganic particles produced by flame jet melting to a resin composition.

The inorganic filler to be used in the present invention are desirably ceramic particles fused and sphered by flame jet melting. Since the ceramic particles are well sphered, they are imparted with high fluidity, and their dispersivity in the resin matrix is very excellent. Accordingly, a larger amount of filler can be satisfactorily added to the resin matrix without deteriorating the mechanical strength of the formed resin articles, and additional properties such as heat resistance and dimensional stability are improved at a lowered production cost.

According to the present invention, the inorganic particles are desirably prepared by rapidly fusing and cooling by the flame jet melting method, so that their surfaces have a fine crystal structure and they are highly miscible with the resin. Furthermore, since the particles are spherical, there are such merits as the wear of metal molds is very slight and the smoothness of the surface of the formed articles is superior.

Meanwhile, it has been found that formed resin articles without addition of fillers, when used in electronic parts, have a poor practical utility because their thermal conductivity is so low as to cause heat accumulation which damages the circuit elements. Therefore, one of the objects of the addition of an inorganic filler in the present invention is to impart good heat conductivity to the formed resin articles. The filler dispersed-resin composition according to the present invention can contain a larger amount of fillers, thereby providing a better heat conductivity desired in formed resin articles used in electronic parts, thus ensuring improved performance of the electronic parts.

DETAILED DESCRIPTION OF THE INVENTION

The inorganic, particularly ceramic fillers to be used in the present invention can appropriately be selected in accordance with the kind and nature of resin to which they are added and the final application of the formed articles obtained. For example, such materials as alumina, silica, magnesia, zircon, zirconia and calcia may preferably be used. To obtain spherical ceramic particles by flame jet melting, the particle size of material rocks or the particle size of ceramic particles prepared by calcination, firing or electro-fusion of material rocks is controlled previously, and a constant amount of the particles with a controlled particle size are introduced by a carrier gas into a high temperature flame, which is generated through a flame jet melting apparatus with the use of a combustion gas such as propane, butane, acetylene and hydrogen as a fuel to melt the particles thereby. Then the particles due to the surface tension of the fused particles, are sphered and thus sphered particles are cooled.

Regarding the flame temperature, it is preferably maintained not lower than 2000° C. and more preferably not lower than 2200° C. Since the combustion gas is fed at a high speed in flame jet melting, when the temperature is lower than 2000° C., the ceramic particles pass through the flame before they are fused sufficiently, thus giving no satisfactory spherical particles. The amount of ceramic particles to be fed into the flame can be controlled in accordance with the reactivity and size of the particles, the kind of combustion gas and others, but the particle concentration rate (the amount of ceramic particles supplied in kg/the amount of combustion gas in $m^3$) in the flame is desirably not more than 10.0. When the particle concentration exceeds 10.0, the flame temperature and the dispersion degree of the particles in the flame are lowered, so that desirable spherical particles cannot be obtained. In some cases, the flame jet melting may be substituted by a plasma arc melting.

The particle size of the ceramic particles should be selected so as to meet with requirements in final applications of formed articles and there is no practical restriction therefor, but too fine particles are difficult to be packed densely and, on the other hand, too coarse particles injure the metal mold severely, resulting in a rough structure of the formed articles. Therefore, although depending on the use, the particle size of the ceramic particles is desirably not larger than 500 μm in diameter for general purposes and, 0.05 to 200 μm in diameter for the use in electronic parts. The filler dispersed-resin composition according to the present invention desirably contains 10 to 95 weight parts of ceramic particles with the remainder being resin (including additives, such as a curing agent and a promotor of hardening). Further, the filler dispersed-resin composition may contain a relatively small amount of conventional angulated particles together with spherical particles. However, the particle size of the angulated particles should be maintained finer than the particle size of the spherical particles.

The kind of resin to be used in the present invention is not limited particularly, and thermosetting resins and thermoplastic resins including epoxy, phenol, acrylic, polyester, silicone and ABS resins may be employed. Further, synthetic rubbers having elasticity, such as silicone rubber, fluorine-contained rubber and ethylene-propyrene rubber may be used, and the resin may contain a stabilizer and a plasticizer.

Still further, the inorganic filler dispersed-resin composition according to the present invention may contain additives, such as a coloring material, a modifier and a pigment in cases of need. Fibrous materials such as asbestos, rock wool, glass fiber, pulp, cotton and rayon may also be added for the purpose of increasing the strength.

The inorganic filler dispersed-resin composition according to the present invention can be prepared by a method conventionally used in the art. For instance, the mixture is kneaded by using a kneader such as a Bumbury's mixer, roll mixer and extruder and then formed by extrusion, jetting, pressing, etc.

The inorganic filler dispersed-resin composition according to the present invention can be advantageously used in applications including industrial parts, such as structural materials, miscellaneous goods for daily use, automobile parts and electric parts, and is particularly suitable for electronic parts, such as insulating bases, sealing materials and heat radiation sheets.

DESCRIPTION OF THE PREFERRED EMBODIMENTS

The present invention will be better understood from the following description of preferred embodiments in comparison with comparative examples.

Examples No. 1 to No. 5 representing the present invention were prepared by using spherical ceramic particles as a filler, which were obtained by fusing the sintered ceramic particles having a controlled particle size ranging from 1 to 50$\mu$ by pulverization in a flame of propane and oxygen at a concentration rate (the amount of ceramic particles supplied in kg/the amount of combustion gas in m$^3$) of 2.5 constantly. In the comparative examples No. 1 to No. 4, the sintered ceramic particles having a controlled particle size ranging from 1 to 50$\mu$ by pulverization, were used as a filler without spherization.

In all the examples, the ceramic particles were mixed with a resin comprising 100 parts by weight of bisphenol-type epoxy resin, 70 parts by weight of anhydromethyltetrahydrophthalic acid as a curing agent and 0.3 parts by weight of benzyl-dimethylamine as an accelerator for curing at a temperature of 80° C., and defoamed for 15 minutes in a vacuum air-conditioning bath. The mixtures were then poured into a metal mold with a wall thickness of 10 mm and preheated to 100° C., defoamed again under vacuum, and cured for 24 hours at 130° C.

The compositions of the inorganic filler dispersed-resin compositions in the present inventive examples and the comparative examples are shown in Table 1, and the physical properties of the formed resin compositions are shown in Table 2.

TABLE 1

| | Composition Inorganic filler (wt. %) | | | | | | | | | |
|---|---|---|---|---|---|---|---|---|---|---|
| | Spherical ceramic particles prepared by flame jet melting | | | | | Pulverized ceramic particles | | | | |
| No. | Alumina | Magnesia | Silica | Zircon | Calcia | Alumina | Magnesia | Silica | Zircon | Calcia |
| Examples | | | | | | | | | | |
| 1 | 80 | — | — | — | — | — | — | — | — | — |
| 2 | — | 80 | — | — | — | — | — | — | — | — |
| 3 | — | — | 80 | — | — | — | — | — | — | — |
| 4 | — | — | 90 | — | — | — | — | — | — | — |
| 5 | 40 | — | 40 | — | — | — | — | — | — | — |
| 6 | — | — | — | 90 | — | — | — | — | — | — |
| 7 | — | — | — | — | 80 | — | — | — | — | — |
| Comparative Examples | | | | | | | | | | |
| 1 | — | — | — | — | — | 80 | — | — | — | — |
| 2 | — | — | — | — | — | — | 80 | — | — | — |
| 3 | — | — | — | — | — | — | — | 80 | — | — |
| 4 | — | — | — | — | — | 90 | — | — | — | — |
| 5 | — | — | — | — | — | — | — | — | 80 | — |
| 6 | — | — | — | — | — | — | — | — | — | 80 |

*The remainder being resin.

TABLE 2

| | Physical properties of the formed resin composition | |
|---|---|---|
| | Thermal conductivity ($\times 10^{-3}$ cal/cm · sec · °C.) | Tensile strength (kg/cm$^2$) |
| Examples | | |
| 1 | 7.8 | 15.0 |
| 2 | 8.7 | 15.0 |
| 3 | 8.2 | 16.1 |
| 4 | 8.1 | 14.8 |
| 5 | 7.9 | 13.0 |
| 6 | 8.0 | 15.1 |
| 7 | 8.5 | 14.9 |
| Comparative Examples | | |
| 1 | 7.2 | 9.6 |
| 2 | 7.1 | 9.8 |
| 3 | 6.1 | 8.0 |
| 4 | 7.0 | 3.0 |
| 5 | 6.8 | 9.8 |
| 6 | 7.0 | 9.0 |

As clear from the above results, all the present inventive examples are excellent in their tensile strength and thermal conductivity. On the other hand, the comparative examples with the use of angulated particles are very low in their tensile strength, and it is obvious that these resin compositions cannot be applied for practical use.

Although not shown in the examples, the use of resins other than epoxy resin gave the result similar to the above.

Further, the resin compositions of the above examples and comparative examples were formed by a low voltage transfer formation process and used as sealing materials for semi-conductor elements (power IC). Then deterioration tests in heated vapor (PCT) were conducted for estimating humidity resistance and heat resistance of the sealing materials. The estimation was determined by the occurrence of open or increase of leak current beyond a certain limit.

The results revealed that the elements sealed by the resin compositions of the examples of the present invention show better heat resistance and less corrosion of the bonding wire than those sealed with the resin compositions of the comparative examples.

What we claim:

1. A ceramic filler dispersed resin composition comprising a resin matrix and fine spherical ceramic particles dispersed in the resin matrix, said ceramic spherical filler particles having been prepared by passing ceramic particles through a flame of propane-oxygen at a temperature not lower than 2,000° C.

2. A ceramic filler dispersed resin composition according to claim 1 in which the ceramic filler particles have a diameter between 0.05 $\mu$m and 200 $\mu$m.

3. A ceramic filler dispersed resin composition according to claim 1 in which the amount of ceramic filler particles is 10 to 95% by weight of the resin composition.

4. A ceramic filler dispersed resin composition according to claim 1, in which the ceramic filler is selected from the group consisting of alumina and silica.

5. A ceramic filler dispersed resin composition according to claim 1, in which the resin is selected from the group consisting of epoxy, phenol, acrylic, polyester, silicone and ABS resins.

6. An electronic part made of a ceramic filler dispersed resin composition according to claim 1.

7. An electronic part according to claim 6 which is an insulating base.

8. An electronic part according to claim 6 which is a sealing material.

9. An electronic part according to claim 6 which is a heat resistant sheet.

* * * * *